O. G. BUTLER.
ROTARY PLOW.
APPLICATION FILED MAR. 27, 1916.
1,223,029.
Patented Apr. 17, 1917.
2 SHEETS—SHEET 2.
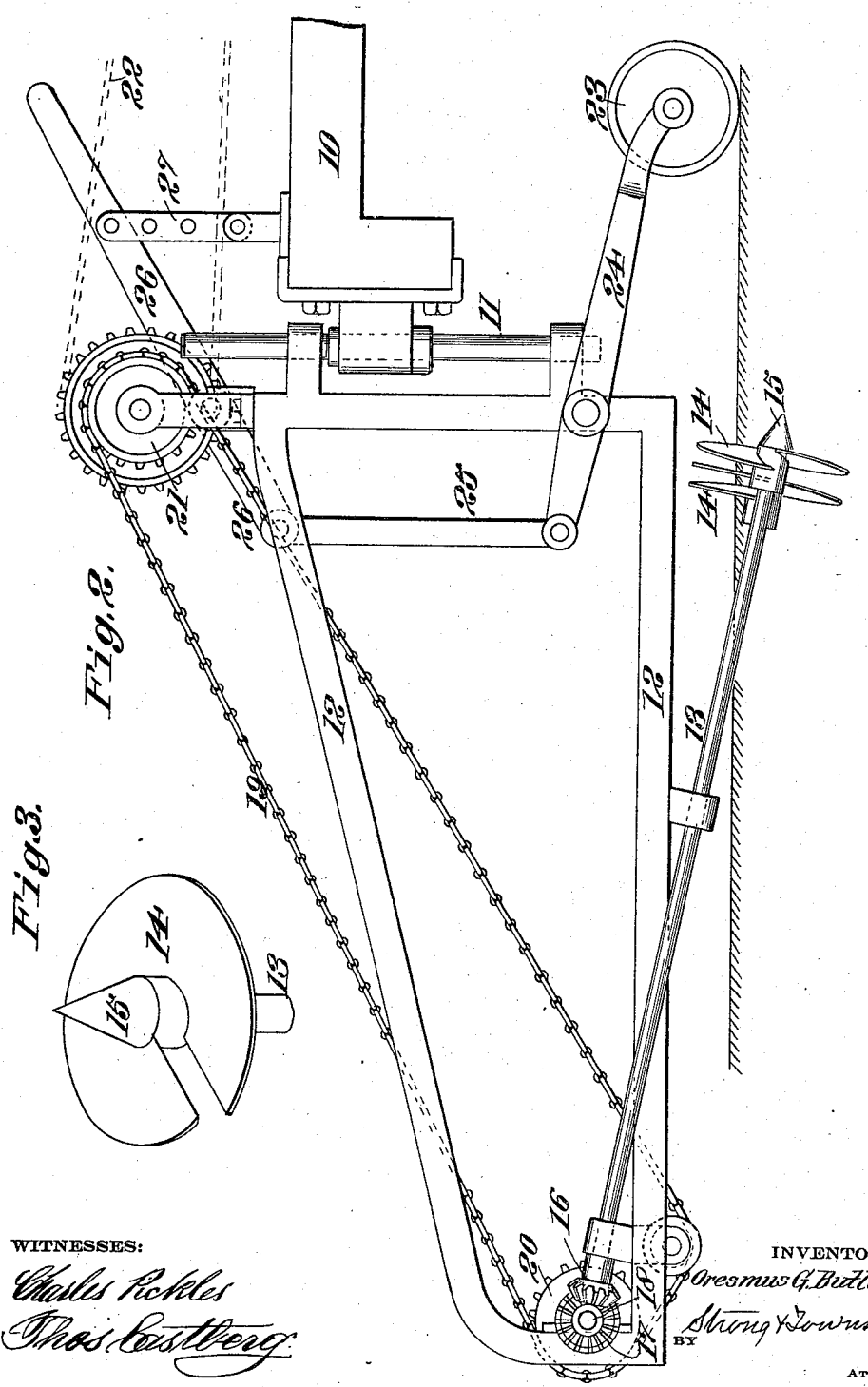
WITNESSES:
Charles Pickles
Thos Eastberg
INVENTOR
Oresmus G. Butler
BY Strong & Townsend
ATTORNEYS

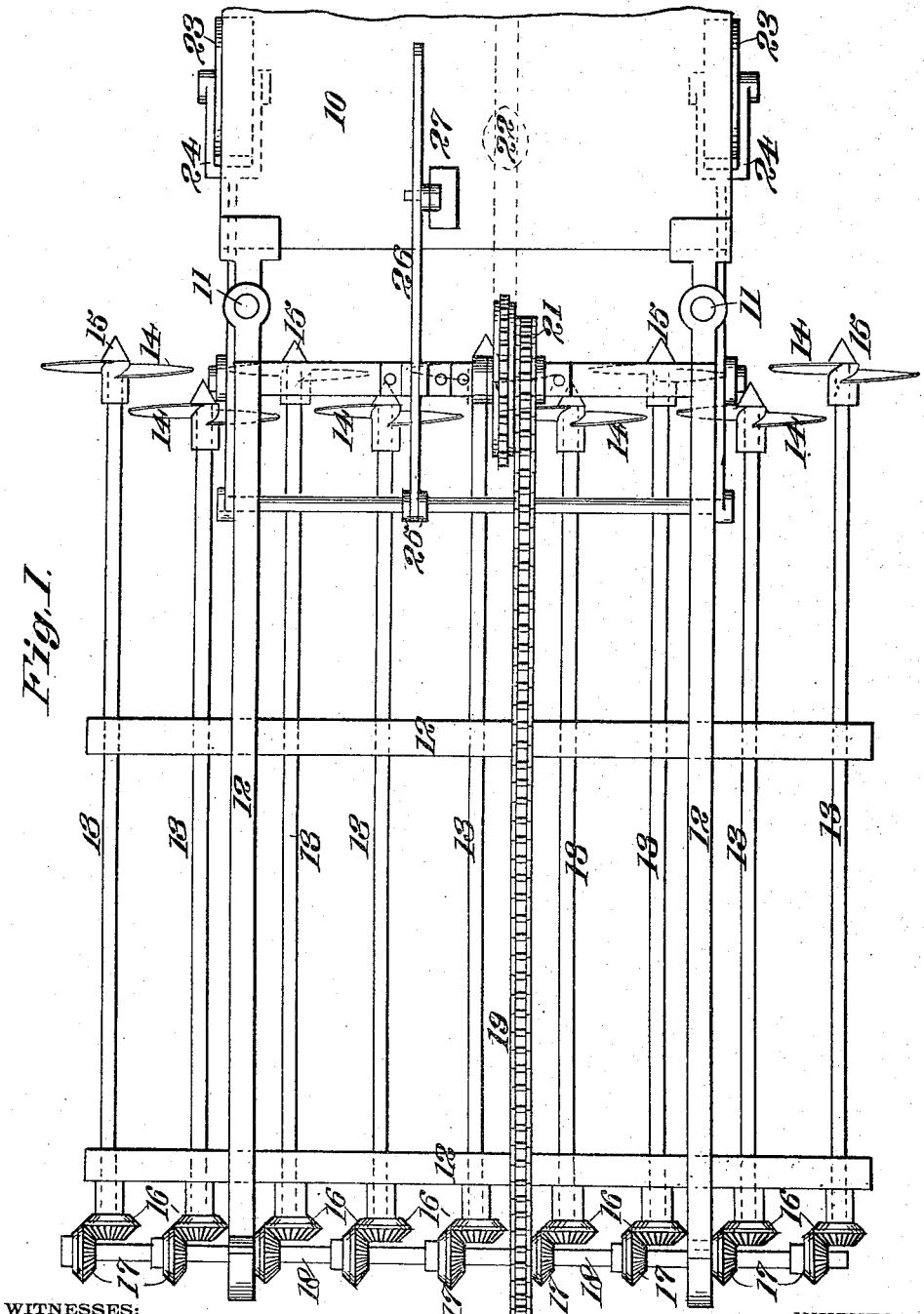

UNITED STATES PATENT OFFICE.

ORESMUS G. BUTLER, OF SAN FRANCISCO, CALIFORNIA.

ROTARY PLOW.

1,223,029.    Specification of Letters Patent.    Patented Apr. 17, 1917.

Application filed March 27, 1916. Serial No. 86,903.

*To all whom it may concern:*

Be it known that I, ORESMUS G. BUTLER, a citizen of the United States, residing in the city and county of San Francisco and State of California, have invented new and useful Improvements in Rotary Plows, of which the following is a specification.

This invention relates to plows and cultivators; and the object of this invention is to use a directly applied power for operating plowing and cultivating instrumentalities, and to provide improved and simplified means for effecting this operation.

In carrying out this object, I employ a series of longitudinally arranged shafts each carrying at its forward end, a spiral cutting member to operate upon the soil, directly connected means for rotating said shafts, and means for adjusting the cutting devices vertically.

One form which my invention may assume is exemplified in the following description and illustrated in the accompanying drawings, in which—

Figure 1 shows a plan view of a device embodying my invention.

Fig. 2 shows a side elevation of the same.

Fig. 3 shows a perspective view of one of the cutting members.

In the drawings, I have shown a tractor or other draft vehicle 10, to which is rigidly connected, by means of vertical spindles 11, a plow frame 12. The frame has a series of longitudinally arranged shafts 13 journaled thereon and inclined forwardly and downwardly, each shaft carrying at its forward end a spiral cutting member 14. The form of the cutting member is similar to an auger, the pitch of the spiral being in a direction to advance in the ground when the member is rotated. On the forward face of each member is a pointed thrust member 15 to pierce the ground. The cutting members are preferably staggered relative to each other to permit close spacing of the shafts 13.

Bevel gears 16, on the rear ends of the shafts 13, mesh with similar gears 17 on a transverse shaft 18 journaled at the rear end of the frame and are driven thereby. A chain 19, running over a sprocket wheel 20 on the shaft 18, connects with a sprocket wheel 21 journaled at the upper and forward end of the frame, which sprocket wheel 21 is operated by means of a belt or chain 22 connected with an engine or other suitable source of power on the vehicle 10 not shown.

The frame 12 is slidable up and down on the spindles 11 and carries, at its forward end, a gage wheel 23, journaled on the end of a forwardly extending arm 24 pivoted intermediately to the frame. A link 25 connects the rear end of the arm 24 to a lever 26, which lever has a detent mechanism 27 for holding it in adjusted position.

In operation, the vehicle 10 is moved along by any desired draft power and the cutting members 14 are rotated by means of the driving source connected with the chain 22. In the case of a tractor the same motor can be utilized for driving the vehicle and also for driving the cutting members. The action of the cutting members will be to thoroughly pulverize the soil, operating through it in the manner of an auger. This type of cutting member is particularly adapted for cultivating soft or broken ground.

By the direct application of power to the cutting members considerable power usually lost in the transmission through the tractive devices is saved. Owing to the shape and the high speed of rotation of the members 14 they will in effect automatically force their way through the ground and the power required to advance the vehicle 10 is, therefore, slight. The raising and lowering of the frame 12 on the spindles through the lever and gage wheel provide means for adjusting the depth of the cutting members and also for raising the same to clear the ground for transporting.

Various changes in the construction and arrangement of the several parts herein may be employed without departing from the spirit of my invention as disclosed in the appended claims.

Having thus described my invention, what I claim and desire to secure by Letters Patent is—

1. In combination with a draft frame, an implement frame, means connecting the front end of the implement frame to the draft frame for supporting the former for vertical adjustment, and earth working means arranged on the rear of the implement frame to aid the first means in supporting said implement frame and thereby assume part of the strain imposed on said supporting means by the weight of the implement frame.

2. In combination with a draft vehicle, an implement frame, means connecting the frame to the vehicle for relative vertical movement, an arm pivoted to the frame and having a supporting wheel on its front end which latter extends in front of the frame, and means adjustable on the draft vehicle and connected with the arm for adjustably holding the wheel.

3. In combination with a draft vehicle, a plow frame having spaced uprights at its forward end each having a spindle bearing, vertical spindles connecting the vehicle and plow frame, an arm pivoted to each frame upright and extending forwardly thereof, a wheel carried by the forward end of each arm, an operating lever pivoted to the plow frame above the arms and having its rear end connected to the latter and its forward end overhanging the vehicle, and a detent device on the latter for engagement by the lever.

4. In combination with a draft vehicle, an implement frame, means connecting the frame to the vehicle for relative vertical and guided movement, a pivoted arm on the frame extending forwardly therefrom, a frame-supporting wheel on the forward end of the arm, an adjusting lever pivoted on the frame and connected with the arm for adjusting the latter, and means on the draft vehicle for adjustably engaging the lever to hold it in a predetermined adjustment.

5. In combination with a draft frame, an implement frame, horizontally spaced vertical spindles carried by one frame, a pair of vertically spaced eyes for each spindle carried by the other frame and slidably engaged with the respective vertical spindle, and supporting wheels carried by the implement frame and disposed forwardly thereof to aid the spindles and eyes in supporting the rear end of the implement frame.

In testimony whereof I have hereunto set my hand in the presence of two subscribing witnesses.

ORESMUS G. BUTLER.

Witnesses:
W. W. HEALEY,
M. E. EWING.

Copies of this patent may be obtained for five cents each, by addressing the "Commissioner of Patents, Washington, D. C."